United States Patent
Perello et al.

(10) Patent No.: US 10,278,438 B2
(45) Date of Patent: May 7, 2019

(54) CONSUMER USABLE DEVICE WITH REDEEMABLE MEMBER

(71) Applicant: Fruition Marketing, LLC, Englewood, CO (US)

(72) Inventors: Jacqueline Perello, Englewood, CO (US); Duane Lopez, Englewood, CO (US); Adam Zimmer, Englewood, CO (US); Reyes Lopez, Englewood, CO (US)

(73) Assignee: Grabbies Media, LLC, Englewood, CO (US)

( * ) Notice: Subject to any disclaimer, the term of this patent is extended or adjusted under 35 U.S.C. 154(b) by 102 days.

(21) Appl. No.: 15/253,622

(22) Filed: Aug. 31, 2016

(65) Prior Publication Data

US 2017/0181488 A1   Jun. 29, 2017

Related U.S. Application Data

(60) Provisional application No. 62/337,889, filed on May 18, 2016, provisional application No. 62/212,107, filed on Aug. 31, 2015.

(51) Int. Cl.
| | |
|---|---|
| *A41D 19/015* | (2006.01) |
| *A41D 19/01* | (2006.01) |
| *A41D 19/00* | (2006.01) |
| *G06Q 30/02* | (2012.01) |
| *B65D 83/08* | (2006.01) |

(Continued)

(52) U.S. Cl.
CPC ... *A41D 19/01594* (2013.01); *A41D 19/0055* (2013.01); *A41D 19/0072* (2013.01); *A41D 19/01* (2013.01); *B65D 83/0805* (2013.01); *G06Q 30/0207* (2013.01); *A41D 19/0096* (2013.01); *A41D 27/08* (2013.01); *G06Q 10/083* (2013.01)

(58) Field of Classification Search
CPC .......... A41D 19/01594; A41D 19/0055; A41D 19/01; A63B 2071/0602; A63B 2071/0661; A63B 2071/0663; A63B 71/0672
See application file for complete search history.

(56) References Cited

U.S. PATENT DOCUMENTS

| | | |
|---|---|---|
| 2,219,501 A | 10/1940 | Wickman |
| 2,358,802 A | 9/1944 | Glover |

(Continued)

OTHER PUBLICATIONS

International Search Report and Written Opinion of PCT/US2016/049761 dated Nov. 17, 2016, all pages.

*Primary Examiner* — Khaled Annis

(74) *Attorney, Agent, or Firm* — Kilpatrick Townsend & Stockton LLP

(57) ABSTRACT

A wearable protection item having a redeemable member is disclosed. The wearable protection item may include a protective glove and a redeemable member. The protective glove may include a finger region, a thumb region, a palm region, a wrist region, and a separable region. The wrist region and the separable region may define an opening into the protective glove. The opening may include an edge. The separable region may be adjacent to the wrist region and the thumb region. The redeemable member may include an exterior surface and an interior surface, where at least one of the exterior surface or the interior surface has indicia thereon, and where the redeemable member is adhered to the separable region.

12 Claims, 13 Drawing Sheets

(51) Int. Cl.
*G06Q 10/08* (2012.01)
*A41D 27/08* (2006.01)

(56) References Cited

U.S. PATENT DOCUMENTS

| | | | |
|---|---|---|---|
| 2,661,476 A | 12/1953 | Bobbitt | |
| 2,915,173 A | 12/1959 | Langdon | |
| 2,995,845 A * | 8/1961 | Fraser | G09F 3/12 |
| | | | 206/278 |
| 3,229,875 A | 1/1966 | Stoller | |
| 3,366,228 A | 1/1968 | Nye | |
| D222,582 S | 11/1971 | Petrie | |
| 3,872,515 A | 3/1975 | Miner et al. | |
| 4,034,853 A | 7/1977 | Smith | |
| 4,034,924 A | 7/1977 | Carlisle | |
| D255,179 S | 6/1980 | Peters | |
| 4,214,321 A | 7/1980 | Nuwayser | |
| 4,240,157 A | 12/1980 | Peters | |
| D275,345 S | 9/1984 | Hall | |
| 4,485,917 A | 12/1984 | Smith | |
| 4,639,947 A * | 2/1987 | Lanscioni | A41D 19/01594 |
| | | | 2/161.5 |
| 4,677,697 A | 7/1987 | Hayes | |
| 4,745,635 A | 5/1988 | Kinnear | |
| 4,791,682 A | 12/1988 | Herr et al. | |
| 4,863,084 A | 9/1989 | Nabozny | |
| 4,918,755 A | 4/1990 | Kinnear | |
| 4,928,322 A | 5/1990 | Bradfield | |
| 5,011,608 A | 4/1991 | Damjanovic | |
| 5,020,160 A | 6/1991 | Cano | |
| 5,025,503 A | 6/1991 | O'Brien | |
| 5,045,341 A | 9/1991 | Shlenker | |
| 5,069,806 A | 12/1991 | Trivett | |
| 5,074,595 A | 12/1991 | Hill et al. | |
| 5,089,157 A | 2/1992 | Trivett | |
| 5,096,089 A | 3/1992 | McLaughlin | |
| 5,173,966 A | 12/1992 | DeLeo | |
| 5,353,439 A | 10/1994 | Kurtz et al. | |
| 5,407,354 A | 4/1995 | Fife | |
| 5,429,377 A | 7/1995 | Duer | |
| 5,467,481 A | 11/1995 | Srivastava | |
| 5,550,167 A | 8/1996 | DesMarais | |
| 5,563,179 A | 10/1996 | Stone et al. | |
| 5,569,103 A * | 10/1996 | Sihn | A44C 15/00 |
| | | | 473/406 |
| 5,740,554 A | 4/1998 | Reed | |
| 5,806,099 A * | 9/1998 | Grinberg | A41D 19/0068 |
| | | | 2/158 |
| 5,817,704 A | 10/1998 | Shiveley et al. | |
| 5,820,142 A | 10/1998 | Duer | |
| 5,933,867 A | 8/1999 | Corder | |
| 5,966,741 A | 10/1999 | Klecina | |
| 6,021,919 A | 2/2000 | Kelly | |
| 6,129,959 A * | 10/2000 | Mercer | B65D 23/14 |
| | | | 283/105 |
| 6,336,568 B1 | 1/2002 | Tucker et al. | |
| 6,375,034 B1 | 4/2002 | Corbett | |
| 6,499,227 B1 * | 12/2002 | Jacobson | D06F 59/04 |
| | | | 34/104 |
| 6,578,729 B2 | 6/2003 | Grinberg | |
| 6,625,816 B1 | 9/2003 | Cooke | |
| 6,643,846 B2 | 11/2003 | Turner-Antonsen | |
| D482,915 S | 12/2003 | Yang et al. | |
| D483,207 S | 12/2003 | Winslow | |
| 6,655,269 B2 | 12/2003 | Litke | |
| 6,691,873 B1 | 2/2004 | Healey | |
| 6,728,971 B1 * | 5/2004 | Benavidez | A41D 19/0027 |
| | | | 2/161.4 |
| 6,836,899 B1 | 1/2005 | Glasmire | |
| 7,063,233 B2 | 6/2006 | Jordan et al. | |
| 7,222,817 B2 | 5/2007 | Stringer | |
| D670,113 S | 11/2012 | Morrison | |
| 8,419,024 B1 | 4/2013 | Arroyo-Ferrer | |
| 8,701,932 B2 | 4/2014 | Reinsel et al. | |
| 8,918,914 B2 | 12/2014 | Estorge | |
| 8,931,112 B1 | 1/2015 | Furst et al. | |
| 8,960,493 B1 | 2/2015 | Dennison et al. | |
| 9,155,349 B2 * | 10/2015 | Madore | A43B 3/0078 |
| 9,295,295 B2 * | 3/2016 | DuChene | A43B 1/0054 |
| 9,809,044 B1 | 11/2017 | Lyon | |
| 10,053,278 B2 | 8/2018 | Ma | |
| 2002/0040912 A1 | 4/2002 | McHugh | |
| 2002/0102208 A1 | 8/2002 | Chinn et al. | |
| 2002/0113079 A1 | 8/2002 | Corbett | |
| 2002/0116746 A1 | 8/2002 | Williams | |
| 2003/0056277 A1 | 3/2003 | Turner-Antonsen | |
| 2003/0213144 A1 | 11/2003 | Jacobson | |
| 2004/0010838 A1 | 1/2004 | Wren | |
| 2005/0193471 A1 | 9/2005 | West | |
| 2005/0204452 A1 * | 9/2005 | Yung | A41D 19/0055 |
| | | | 2/167 |
| 2005/0218612 A1 | 10/2005 | Malchow | |
| 2006/0010563 A1 | 1/2006 | Michel et al. | |
| 2006/0049199 A1 | 3/2006 | West | |
| 2006/0143767 A1 | 7/2006 | Yang et al. | |
| 2006/0286944 A1 | 12/2006 | Songwe | |
| 2007/0094766 A1 | 5/2007 | Liu | |
| 2007/0150996 A1 * | 7/2007 | McCarville | A41D 19/0072 |
| | | | 2/159 |
| 2008/0016601 A1 | 1/2008 | McCrorey et al. | |
| 2008/0072248 A1 | 3/2008 | Sosalla et al. | |
| 2008/0083720 A1 | 4/2008 | Gentile et al. | |
| 2008/0083721 A1 | 4/2008 | Kaiserman et al. | |
| 2008/0083740 A1 | 4/2008 | Kaiserman et al. | |
| 2008/0151263 A1 | 6/2008 | Randers-Pehrson et al. | |
| 2008/0241511 A1 | 10/2008 | Sandford et al. | |
| 2008/0242794 A1 | 10/2008 | Sandford et al. | |
| 2009/0223411 A1 | 9/2009 | Higgins et al. | |
| 2009/0252647 A1 | 10/2009 | Orofino | |
| 2009/0258218 A1 | 10/2009 | Sandford et al. | |
| 2009/0258984 A1 | 10/2009 | Sandford et al. | |
| 2009/0293166 A1 | 12/2009 | Shayne | |
| 2010/0017939 A1 | 1/2010 | Carpenter, Jr. | |
| 2010/0078351 A1 | 4/2010 | Sherrill | |
| 2010/0080388 A1 * | 4/2010 | Daniel | A63B 71/06 |
| | | | 380/270 |
| 2010/0093851 A1 | 4/2010 | Blanton et al. | |
| 2010/0167613 A1 | 7/2010 | Higgins et al. | |
| 2010/0227520 A1 | 9/2010 | Claasen et al. | |
| 2011/0070376 A1 | 3/2011 | Wales et al. | |
| 2011/0143623 A1 | 6/2011 | Abed et al. | |
| 2011/0186589 A1 | 8/2011 | Lee | |
| 2011/0223378 A1 * | 9/2011 | Bauer | A41D 27/08 |
| | | | 428/124 |
| 2012/0004761 A1 | 1/2012 | Madruga | |
| 2012/0005809 A1 | 1/2012 | Johnson | |
| 2012/0251597 A1 | 10/2012 | Gupta et al. | |
| 2012/0277904 A1 | 11/2012 | Pritchard et al. | |
| 2012/0295892 A1 | 11/2012 | Cook et al. | |
| 2014/0259284 A1 | 9/2014 | Maltese | |
| 2014/0260091 A1 | 9/2014 | Sacks | |
| 2015/0026867 A1 | 1/2015 | Brzoska | |
| 2015/0230645 A1 | 8/2015 | Dennison et al. | |
| 2015/0230672 A1 | 8/2015 | Moskowitz et al. | |

* cited by examiner

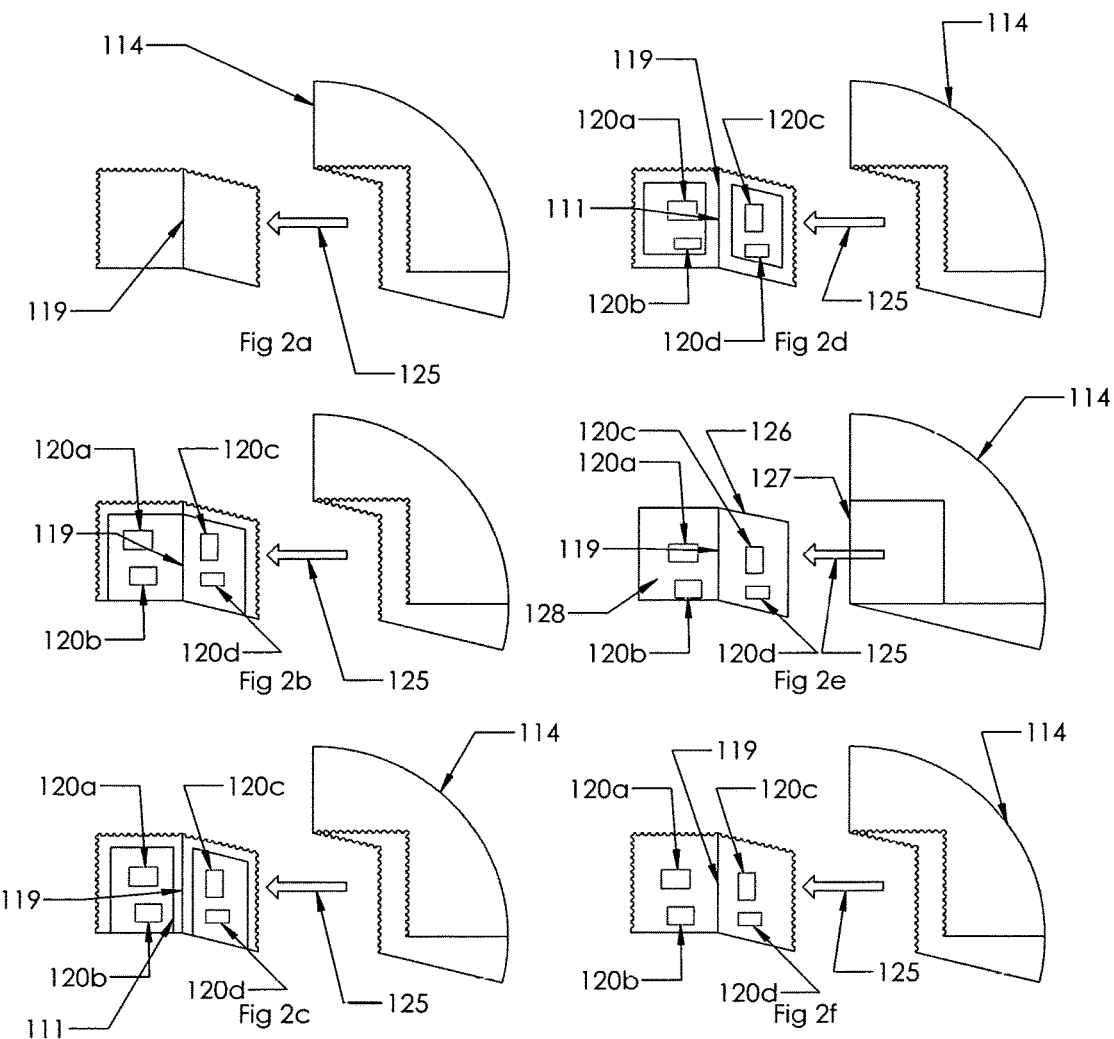

CONSUMER USABLE DEVICE WITH REDEEMABLE MEMBER

CROSS REFERENCE TO RELATED APPLICATIONS

This application claims priority to Provisional U.S. Patent Application No. 62/212,107 filed Aug. 31, 2015, entitled "GRABBIES PROMO GLOVE," and Provisional U.S. Patent Application No. 62/337,889 filed May 18, 2016, entitled "COUPON SYSTEM AND PROCESS OF USE." The entire disclosure of both of the aforementioned Provisional U.S. Patent Applications are hereby incorporated by reference, for all purposes, as if fully set forth herein.

FIELD OF THE INVENTION

The present invention is directed to a consumer usable device including a promotional redeemable member which may be removed while worn by the consumer. The consumer usable device may be a protective glove for use at gasoline stations, convenience stores, and other locations where petroleum-based products are handled and dispensed. In some examples, the redeemable member may include advertisements and special product deals which encourage a patron to use the protective glove and interact with the redeemable member.

BACKGROUND OF THE INVENTION

Some stores, such as convenience stores and gas stations, are visited by many consumers and patrons throughout the day. However, as pumping stations are not located within the premises of a store or other vendor, many consumers are able to complete their entire transaction without entering the store or other vending location. When a patron enters the store where other products are being sold, they may only do so for a particular reason besides purchasing items. This results in missed opportunities for sales, especially when promotional deals or specials are available which the customer may be interested in. Conventionally, stores may post signs around the inside and outside of the store to advertise to consumers or may pay for a relatively more expensive interactive advertisement.

In many commercial environments, it is common to provide protective garments and tools. Whether at a gasoline station, restaurant, music venue, and the like, it may be desirable to advertise goods or services from a particular company or vendor to encourage foot traffic and awareness of products and specials. Such protective garments may be produced inexpensively, and a consumer may often discard these disposable tools or garments after a single use, contributing to the amount of litter, unsustainably consuming resources, harming ecosystems or animals, clogging drainage or sewage systems, and contributing to other environmental impacts.

In many regions, it is common to provide protective garments to prevent liquids, dirt, germs, and the like from contaminating a user's hands, clothing, and the like. While popular with some patrons, many consumers will choose not to use a protective garment if it is not "green," or recyclable and/or environmentally sustainable. However, if the protective garment and redeemable item are made from a biodegradable or compostable material, concerned consumers will be more likely to utilize the protective garment. This will increase the exposure of advertisements, promotions, and the like provided on the redeemable member and the protective garment, and increase the sales of items in a vendor's store by encouraging or incentivizing consumers to enter the establishment.

Additionally, there is a need for promotional garments and other products that are inexpensive, provide functional protection from the environment, and are capable of delivering a coupon or advertisement to a consumer. Often the coupon comes attached to a promotional garment and is removed when the garment is not being worn by a user. This creates limitations in the use of the garment as well as the manufacturing and packaging of a plurality of garments. The present invention solves this problem by the placing the coupon in a strategic location that is designed to be destructively removed from the garment without affecting the functionality of the garment and allows for a unique stacking configuration for packaging a plurality of garments.

BRIEF DESCRIPTION OF THE DRAWINGS

FIG. 2A-2F illustrates a section view of alternative embodiments of the consumer usable device and redeemable member of FIG. 2.

DETAILED DESCRIPTION

Figure 1:
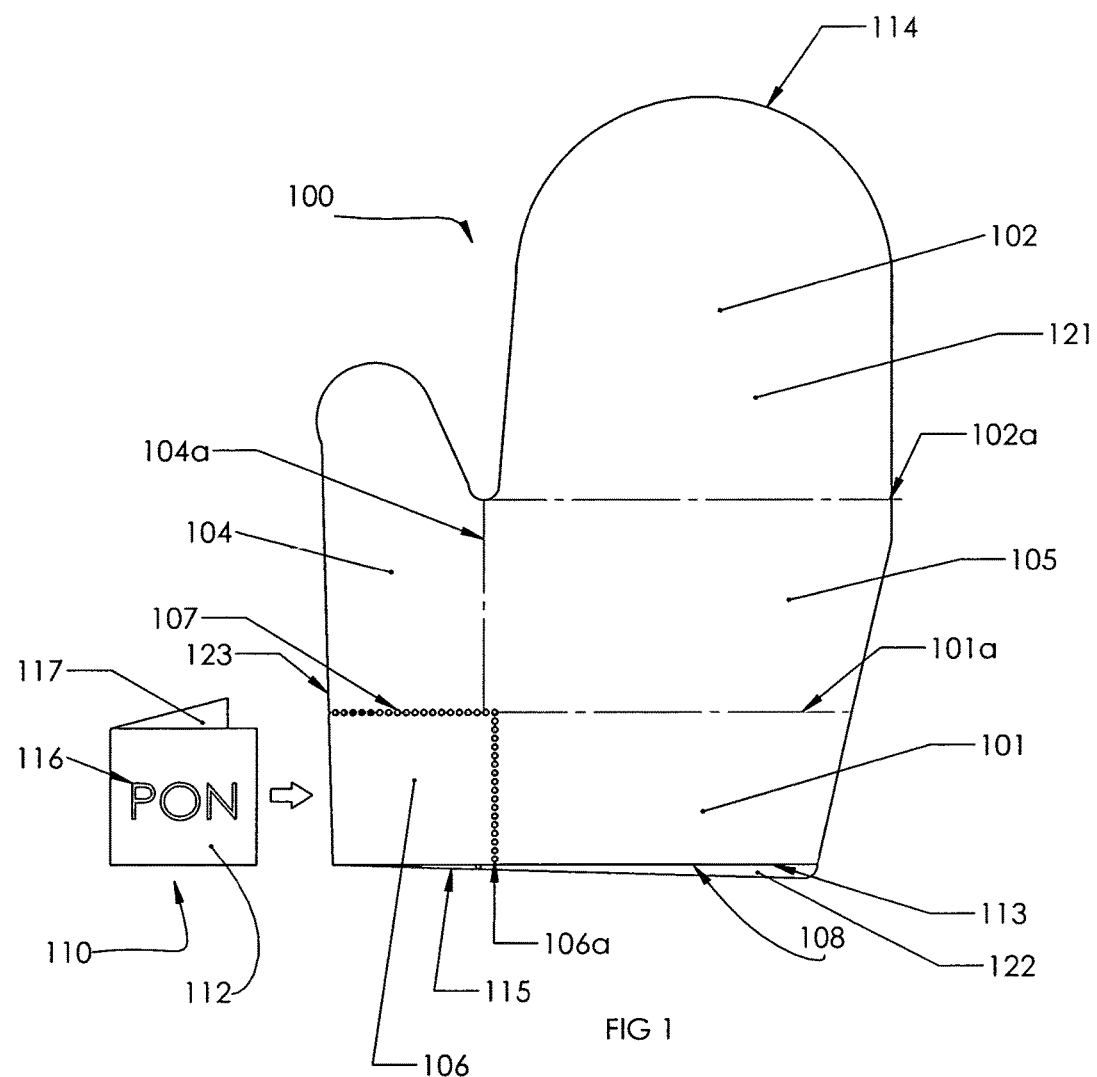
FIG. 1 illustrates an example of a consumer usable device, such as a protective glove, and a redeemable member prior to attachment to the consumer usable device.
Figure 1A:
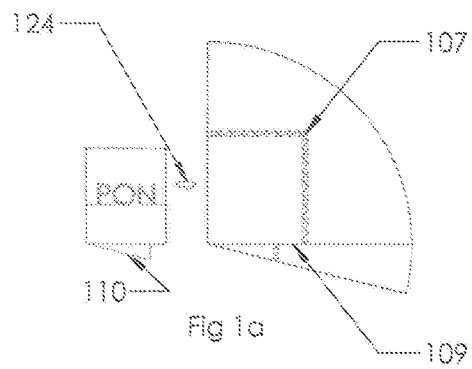
FIG. 1A-1F illustrates a section view of alternative embodiments of the consumer usable device and redeemable member of FIG. 1.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may (affirmative claim recitations) or may not be (negative claim recitations) present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid further obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, etc.

The present disclosure is directed to a consumer device comprising a redeemable or incentivizing member which can be used with a redemption system. The redeemable member may be a commercially redeemable member which allows a user access to special deals, promotions, websites, and the like. The redeemable member may also include a loyalty or rewards program which allows the user to accumulate points or credit over time. The size, shape, color, and the like may be selected to draw a user's attention to the redeemable member and encouraging the user to interact with the redeemable member.

In some examples, the consumer usable device may be a protective glove for use at a restaurant, gasoline stations, and the like. In other examples, the consumer device may be a litter or garbage bag, protective garments such as ponchos, hats, jerseys, and the like. The consumer usable device may be formed from a biodegradable and compostable material. This may encourage users who would otherwise not want to create waste to use the consumer usable device. This increases consumer exposure to the redeemable device and promotional indicia, advertisements, rewards programs, and the like provided with the redeemable device. This in turn can increase sales at the store, especially in locations where consumers may not otherwise enter the interior of a store, such as a gasoline station or convenience store.

By providing a biodegradable, earth-friendly consumer usable device and providing a redeemable member, product exposure can be improved while also encouraging more foot traffic in the vending establishment. By incentivizing a consumer with a promotional deal, product sales may also be improved. The present disclosure will now be discussed with further reference to the drawings.

FIG. 1 illustrates an example of a consumer device such as a protective glove 100. The protective glove 100 may include a redeemable member 110 which is coupled to the protective glove 100 (show by attachment vector. The protective glove 100 includes a wrist region 101 (the area defined by line 106a and line 101a), a finger region 102 (the area defined by line 102a), a palm region 105 (the area defined by lines 102a, 101a, and 104a), a thumb region 104 (the area defined by 104a and 101a), and a separable region 106 (defined by lines 101a and 106a). An opening 108, adjacent to the wrist region 101 and separable region 106, having an edge 113, enables a user to insert their hand into the glove 100. The protective glove has a body 114, formed of a base layer, defined by the summation of the areas making up the wrist region 101, finger region 102, palm region 105, and thumb region 104, which offers protection to the user when the glove is worn.

The finger region 102 may have a single volume for containing four fingers of a user, and the thumb region 104 may be sized for containing a user's thumb. In other examples, the finger region 102 may include individual cut-outs or demarcations for a user's index finger, middle finger, ring finger, and pinkie finger.

The glove 100 may be formed using substantially any material. The material may be chosen based on how the glove 100 is used. In one example, the glove 100 may be formed by a base layer of a polymer capable of effectively protecting a user's hand from environmental elements including water, gasoline, dirt, germs, and the like. In another example, the glove 100 may be formed from a thin plastic layer or web material, wax treated paper or textile materials, non-woven fabrics, or elastomeric material such as spandex, rubber, and the like. In a particular example, the glove 100 may include a base layer formed from a biodegradable cornstarch-based polymer. In addition to being biodegradable and compostable, the cornstarch-based polymer may have a more pleasing tactile feel compared with other materials while advantageously reduce the build-up of condensation, sweat, and the like when a user is using the protective glove 100. In some examples, a protective glove 100 may be coated internally with a substance such as chalk powder to absorb moisture and aid in use and removal.

Figure 1D:
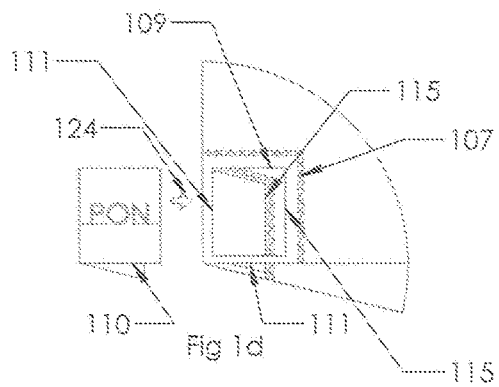
Figure 1B:
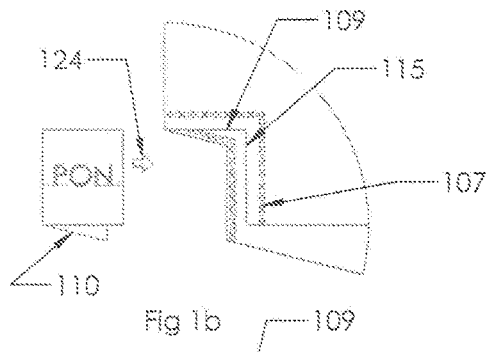

The protective glove 100 may include separable region 106. The separable region may include a coupling or adhesion area 109 to which attaches to the redeemable member 110 and perforations 107 that allow the redeemable member to be easily and repeatable removed from the glove 100. In another example, the perforations may be weakened areas of the material such as a thinner region, a creased region, a serrated region, and the like. The separable area may be intact between the adhesion area and the opening of the glove, or it may include a hanging section 111 and an open section 115 which is removed to allow for a reduction of the amount of material used to manufacture the glove 100 and provide visibility of the inner surface of the redeemable member 110 as described below and shown in FIGS. 1b thru 1d after the redeemable member 110 is removed from the glove 100. In one example, the separable region 106 comprises a smaller portion of the edge 113 than the wrist region 101

As shown in FIGS. 1, 2, 1a thru 1f, and 2a through 2f, the separable region may be formed on a front side 121 and back side 123 of the glove 100, and the structure of the perforations 107, adhesion area 109, hanging section(s) 111, and open section(s) 115 are symmetric about the opposing sides along seam 123 extending from the thumb region 104 to the opening 108, as seen in FIG. 1 for example. The redeemable member 110 may be attached to the protective glove 100 in the separable region 106, as shown FIG. 3 for example, so it may be removed from the top portion of their wrist when the user is wearing the glove on their hand, as shown in FIGS. 2, 2a thru 2f, and 3. Said another way, the redeemable member 110 may be symmetrically positioned adjacent to the wrist region 101 and thumb region 104 such that a portion of the redeemable member 110 is visible on both the front and back side of the protective glove 100. That is, when worn the glove 100 may be used ambidextrously while ensuring high visibility of the redeemable member 110 on the top of the user's wrist when worn, as shown in FIG. 3 for example. This may also increase exposure of promotions and other advertisements and encourage a user to interact with the redeemable member 110. The position of the redeemable member 110 on the glove 100 allows the glove to be worn when redeemable member 110 is removed. This placement of the redeemable member also enables a compact folded stack of protective gloves 100, as discussed below with respect to FIG. 12.

The redeemable member 110 may be formed from a similar material as the protective glove 100. In some examples, the redeemable member 110 may include a base layer of a polymer material, such as a cornstarch-based, biodegradable polymer as discussed above. However, the redeemable member 110 may include one or more layers of similar or dissimilar material, including paper-based materials, textiles, woven or non-woven fabrics, and/or plastic materials.

In other examples, the protective glove 100 may be formed from a composite material including plant seeds and a biodegradable material. Accordingly, if a protective glove 100 or other consumer usable device is accidentally disposed of improperly, the biodegradable material will degrade and leave the seeds behind to be implanted in the soil. In some examples, plant, tree, or flower seeds may be included. It is noted that a cornstarch-based biodegradable polymer as discussed above may be used as it breaks down very quickly and without polluting or otherwise damaging the environment.

The redeemable member 110 may be separable from the body of the protective glove 100 along with the adhesion area 109 and any structure contained within the open section 115 and hanging section 111 (depending on the embodiment of the separable area 106) along the perforations 107.

Figure 1E:
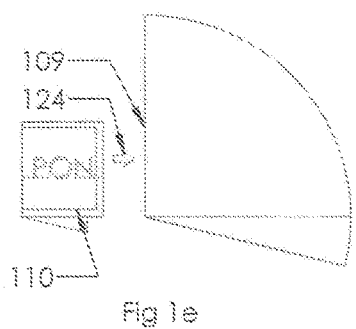
Figure 1C:
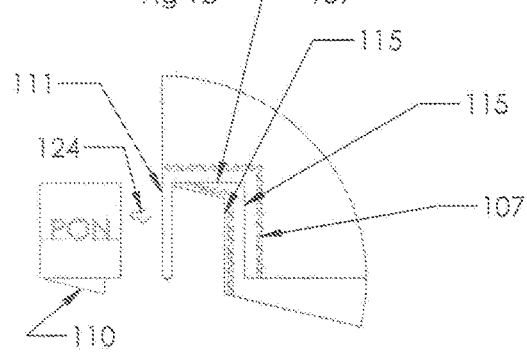

The redeemable member 110 may comprise a first layer 126 and a second layer 127, as shown in FIGS. 1e and 2e. The first layer may comprise an interior surface 128 which is disposed on the second layer 127. The first layer couples to the second layer through adhesion, welding, sewing, or any other coupling means. In this example, the first layer 126 may be removed from the second layer by the user for redemption. The removal process may comprise peeling, tearing, or any other means of removing the first layer 128 from the second layer.

It is emphasized that separable region 106 may enable a user to remove the redeemable member 110 during and/or after using the protective glove 100. This may allow a user to remove the redeemable member 110 while using the glove 100 and save it to be used with a redemption system (not shown) at a later time. It is noted that the size and shape of the separable region 106 may be chosen such that the body of the glove 100 remains functional when the redeemable member 110 is removed from the protective glove 100. That is, the redeemable member 110 may be destructively removed from the protective glove 100 along with a portion of the separable region without affecting the functionality effectiveness of the glove 100. In other examples, the redeemable member 110 may be formed from the base layer of the protective glove 100. Said another way, the redeemable member may be formed integrally within the confines of the perforations of the separable region 106 to be destructively removed.

The protective glove 100 may optionally be formed from a composite material including plant seeds and a biodegradable material. Accordingly, if a protective glove 100 or other consumer usable device is accidentally disposed of improperly, the biodegradable material will degrade and leave the seeds behind to be implanted in the soil. In some examples, plant, tree, or flower seeds may be included. It is noted that a cornstarch-based biodegradable polymer as discussed above may be used as it breaks down very quickly and without polluting or otherwise negatively impacting the environment.

Figure 1F:
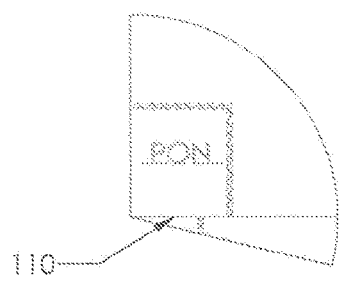

In some examples, the redeemable member 110 is integral with and formed from the base layer of the protective glove 100, as seen in FIGS. 1f and 2f In other examples, the redeemable member 110 may be substantially the same thickness as the base layer of the glove 100. Accordingly, adhesion area 109 and the structure within its confines may have a reduced thickness compared to the body 114 of the glove 100, thus making the outer surface of the glove 100 and redeemable member 110 essential coplanar to reduce thickness variations of the combination to reduce stack buildup of a plurality of stacked gloves 100, as describe below referencing FIG. 12.

The redeemable member 110 may include indicia 116 on an outer surface thereof. Accordingly, when a user is applying the glove 100 to their hand and during use, a user's attention may be drawn to the indicia 116, as discussed below in the example of FIG. 3. The indicia 116 may take substantially any form, including advertisement and product placement information and pictures, coupon details, deals and product sales, an interactive game, athletic team logos, other redeemable codes, and the like. In some examples, the indicia 116 may be printed may be embedded, adhered to, or otherwise coupled to an outer surface 112 of the redeemable member 110.

Figure 2:
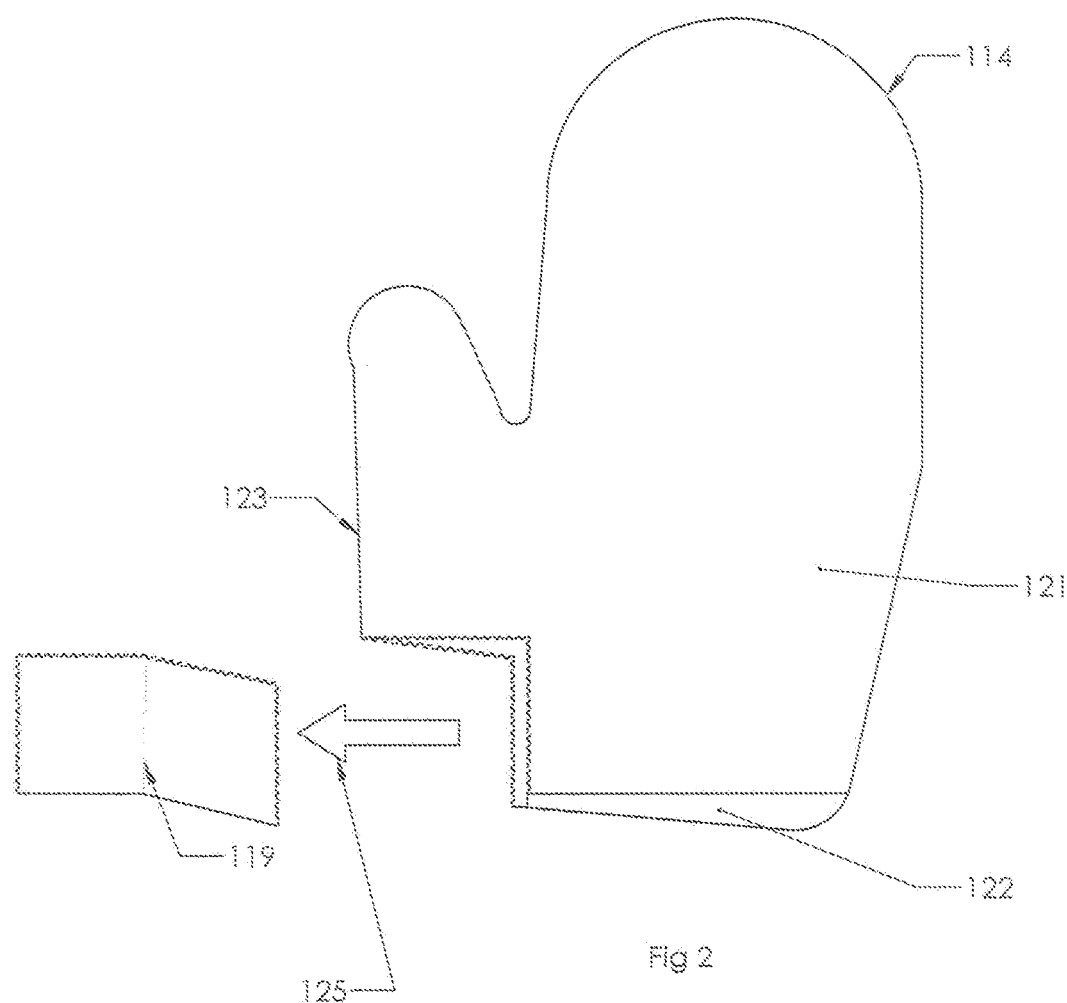
FIG. 2 illustrates an example of a consumer usable device, such as a protective glove, and a redeemable member after removal from the consumer usable device.
Figure 3:
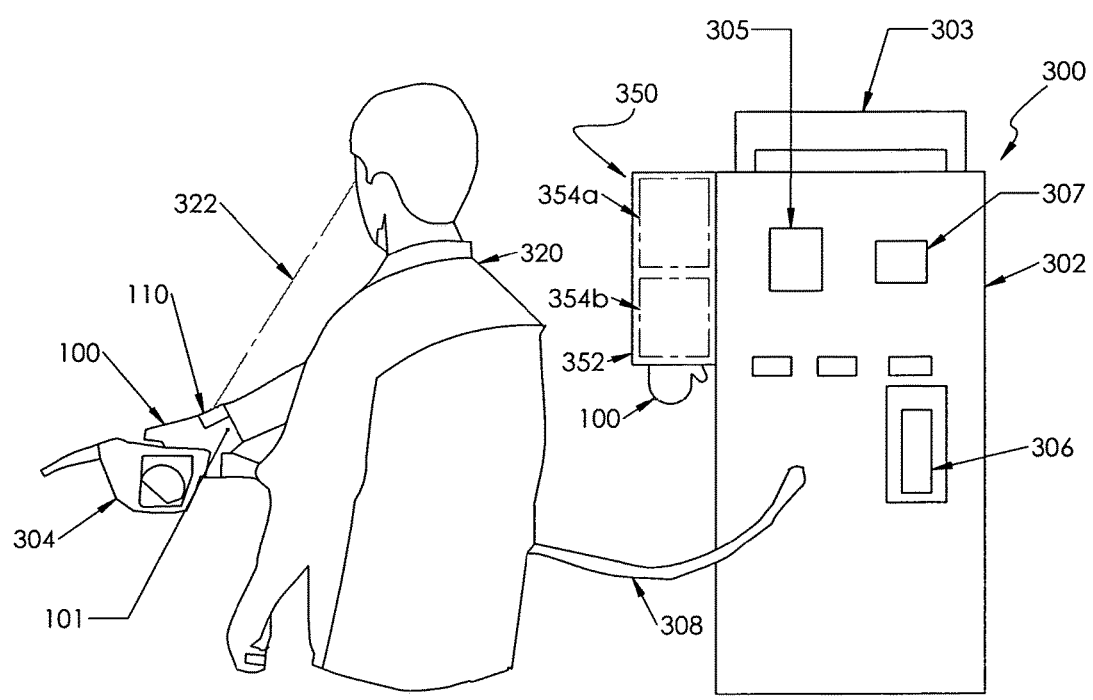
FIG. 3 illustrates the use of a protective glove at a pump for petroleum products.

FIG. 2A illustrates an exterior surface of the redeemable member 110 after it is destructively removed from the glove 100 in an unfolded configuration. FIG. 2B illustrates an interior surface 117 of the redeemable member 110 after it is destructively removed from the glove 100 in an unfolded configuration. The portions of the separable region 106 of glove 100 which are removed with the redeemable member 110 include a portion of the perforations 107, the adhesion area 109, and any structure within the confines of the adhesion area which include the hanging section 111 in the depicted embodiment. It is shown in FIG. 2b that the open section 115 allows the user to clearly see the inner surface 117 of the redeemable member 110 after removal. The redeemable member 110 may include a folded region 119 such as a crease or living hinge that allows it to be attached to the glove symmetrically about the front and back side of the glove adjacent to the thrum region 104 and wrist region 101, as seen in FIGS. 1 and 2 for example. The redeemable member 110 may also include an inner surface 117, a plurality of indicia 120, and one or more redemption devices 122a-d. In some examples, the indicia 120 may correspond to the indicia 116. For example, the indicia 116 and 120 may entice a user to remove the redeemable member 110 for redemption. In some examples, the indicia 116 and 120 may include further information regarding special deals, products for purchase, part of an interactive game such as an answer to a trivia question, advertisement and product placement information and pictures, coupon details, deals and product sales, an interactive game, athletic team logos, other redeemable codes, and the like. The indicia 116 and 120 may also include information regarding the establishment where the protective glove 100 is obtained, thereby enticing or encouraging a user to patronize the establishment. This may increase foot traffic in the establishment, improve visibility of advertised products, and improve sales.

The redemption device(s) 122a-d may take the form of a radio frequency identification (RFID) or near-field communication (NFC) chip 122a, a peel-and-reveal or scratch-off game 122b, a quick response (QR) code 122c, bar code 122d, and the like. It is noted that the redemption device(s) 122a-d may take substantially any form which allows a user to redeem the redeemable member 110, all of which are considered a means for data collection. Similar to indicia 116, in some examples the indicia 120, and redemption device 122 may be printed, embedded, adhered to, or otherwise coupled to an inner surface 117 or outer surface 112 of the redeemable member 110. Additionally, an RFID or NFC redemption device 122a may be used to determine inventory amounts and the number of gloves 100 being dispersed from a dispenser, such as the distribution systems 350, 700, 1000 discussed below with respect to FIGS. 3 and 7-10.

FIG. 3 illustrates one example of the protective glove 100 and redeemable member 110 for use at a pump 300 for gasoline, diesel, and other petroleum products. The pump 300 may be positioned at a convenience store, dedicated gasoline distributor, and the like, and may include a distribution system 350 for dispensing one or more protective gloves 100. The pump 300 may include an enclosure 302, one or more signs 303, a purchase screen 305 for selecting different purchase options, and payment device 307 which may allow credit card magnetic strip swiping. The pump may include a spout or nozzle handle 304 coupled to the pump by a hose 308. The nozzle handle 304 may be stored in a storage area 306 when not in use.

The dispenser 350 may be coupled to the enclosure 302 and be easily accessible when a user approaches the pump 300. The dispenser may be removably coupled to the pump 300, such as a magnetic attachment, keyhole hanger, and the like. In other examples the dispenser 350 may be permanently or semi-permanently attached to the enclosure 302 of the pump 300 using adhesive, screws, hook and loop attachments, and the like. The dispenser 350 may include a housing 352 for enclosing a plurality of storage containers 354a-b. The storage containers 354a-b may be sized and shaped to store a plurality of protective gloves 100. The plurality of gloves 100 may be stacked to increase the number of gloves 100 available in the storage containers 354a-b, as will be discussed below with respect to FIG. 12. The dispenser 350 may have an opening in a bottom (not shown) for accessing protective gloves 100.

As illustrated in the example of FIG. 3, a user 320 may conveniently access protective gloves 100 when accessing the pump 300. The distribution system 350 may include eye-catching elements such as lights, advertisements, bright colors, and the like to encourage the user 320 to use the protective gloves 100. As discussed above, in some examples the protective glove 100 may be formed of a material which can protect a user from exposure to petroleum-based products such as gasoline, diesel, kerosene, and the like. In some examples the protective glove 100 may be formed from a biodegradable, cornstarch-based polymer. By making the protective gloves 100 from a biodegradable material, a user may be more inclined to use the protective glove 100 and the redeemable member 110 due to environmental concerns.

During use, a user may put a protective glove 100 on their hand before operating the pump 300. Since pumps 300 are often located outdoors and used by many patrons, the payment device 307, such as for example a credit and debit card reader and number pad, and the pump nozzle handle 304 may easily accumulate dirt, grime, germs, and other contaminants. Accordingly, a user 320 may protect their hands from contaminants by using the protective glove 100. Furthermore, when the glove 100 is formed from a petroleum-resistant material, the user can be assured that petroleum products will not seep through onto their hands. These qualities may entice a user to use the protective gloves 100, and thereby increase exposure to the redeemable member 110, which may encourage them to enter the store where the pump 300 is located. This may improve the amount of business in the store, which increases the likelihood of a user 320 purchasing one or more items.

As discussed above, the redeemable member 110 may be sized and placed to more easily enable a user to grip a protective glove 100 when putting the glove 100 on their hand. As illustrated in FIGS. 1-3, the redeemable member 110 may be positioned adjacent to the thumb region 104 and wrist region 101 of the protective glove 100, and may extend around a portion of the user's 320 wrist. This may ensure that the redeemable member 110 is positioned within the line of sight 322 of a user 320 when the glove 100 is in use, and allow it to be removed when the user is wearing it. This is opposed to the separable region extending around the entirety of the user's wrist as removal of the separable region is not possible in this configuration when the glove 100 is being worn by the user. The increased visibility of this position and ease of removal may further encourage and incentivize a user to interact with the redeemable member 110. The indicia 116 may be applied to the redeemable member 110 such that is it legible and clearly visible on the redeemable member 110 when in use. That is, the redeemable member maybe symmetrically provided about a portion of the user's wrist adjacent to their thumb, and enable ambidextrous use of the protective glove 100 and maximize exposure of the redeemable member 110.

Figure 4:
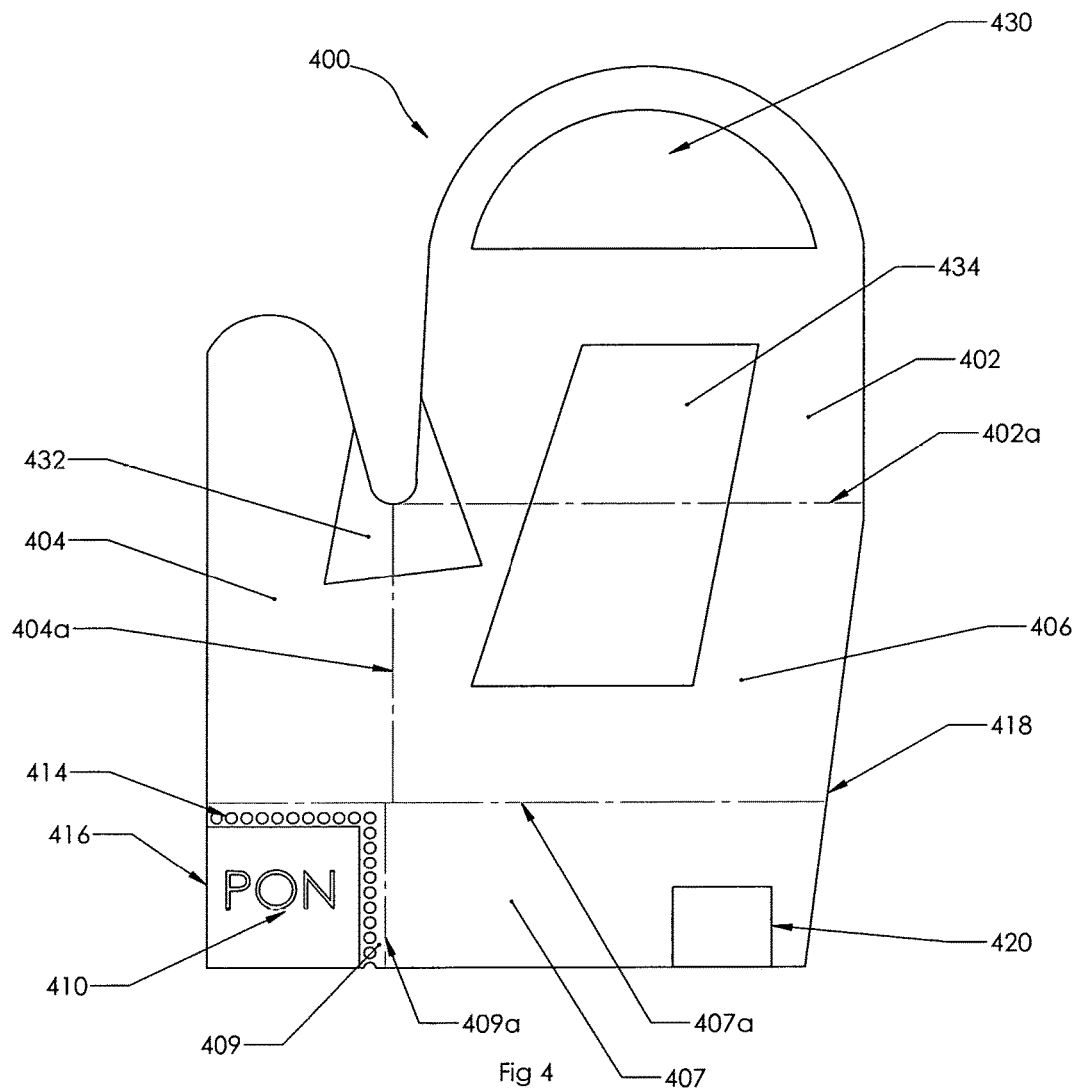
FIG. 4 illustrates another example of a protective glove and redeemable member.

FIG. 4 illustrates another example of a protective glove 400 with the redeemable member 416 attached (as opposed to separate as seen in FIG. 1). The protective glove 400 may be substantially the same as the protective glove 100 and may include additional functional layers. The protective glove 400 may include a finger region 402 (the area defined by line 402a), thumb region 404 (the area defined lines 404a and 407a), palm region 406 (the area defined by lines 402a, 404a, and 407a), a wrist region 407 (the area defined by 407a and 409a), and a separable region 409 (the area defined by lines 409a and 407a). A tapered area 418 may be provided in some examples to more snugly or securely fit a user's hand and reduce the amount of material used to manufacture the glove 400. One or more functional layers may be included with the protective glove 400.

In some examples, functional layers 430, 432, 434 may be a thickened region formed from the same or a similar material as the body of the protective glove 400, and may be integrally formed or applied after formation of the glove 400. Functional layers 430, 432, 434 may provide an additional protective barrier such as protection against punctures and tears, thereby further encouraging a user to use the protective glove 400 and interact with a removable member 410. In other examples, functional layers 430, 432, 434 be selected to provide an insulating layer between a user and the environment, especially in colder environments and during the winter. This may advantageously keep a user's hand warm while maintaining the integrity of the glove, thereby increasing the likelihood of a user utilizing the glove 400 and interacting with redeemable member 410. In other examples, the functional layers 430, 432, 434 may be provided to improve a user's grip by including a textured or roughened surface. It is noted that the functional layers may be chosen to achieve more than one purpose.

Furthermore, functional layers 430, 432, 434 may provide additional chemical and environmental resistance. In the example of a glove 400 formed of a cornstarch based polymer material as discussed above, the functional layers 430, 432, 434 may prevent the breakdown of the base layer of the palm region 406 of the glove 400 caused by water, petroleum, and wear and tear by the user. As discussed above, a cornstarch polymer-based base layer may reduce the buildup of condensation, sweat, and the like inside the protective glove 400. In some examples, a protective glove 400 may be coated internally with a substance such as chalk powder to absorb moisture and aid in use and removal.

The glove 400 may further include a tracking device 420 such as a RFID tag. The tracking device 420 may be provided in each glove 400 to obtain an accurate inventory count and inform a vendor to refill the glove dispenser. In other embodiments, the tracking device 420 may be provided at spaced intervals within a stack of gloves 400, such as a stack of gloves in a storage container 354*a*-*b* as seen in FIG. 3. Further, the tracking device 420 may be used to give an indication of the number of patrons who use the protective glove 400. A vendor may use this information to track the visibility of redeemable members 410, and determine a connection between a patron using a glove 400 and subsequently entering a store to redeem the redeemable member 410.

The redeemable member 410 may be substantially the same as a redeemable member 110 discussed above in FIGS. 1-3. The redeemable member 410 is attached to the glove 400 in the separable region 409 which may comprise perforations 414 to assist in the removal of the portion of the separable region 409 attached to or constrained by the redeemable member 416 when destructively removed from the glove 400. The perforations may be formed, for example, by using perforations or pre-stressing the base layer to for stress concentrations for predictable removal. The separable region 409 enables a user to remove the redeemable member 410 while wearing the protective glove 400. This allows a user to interact with, remove, and/or store the redeemable member 410 for redemption while pumping petroleum, and subsequently dispose of the glove 400 appropriately. It is noted that the shape/size of separable region 409 and the separation structure 414 may be chosen such that the palm region 406, wrist region 407, and thumb region 404 remain intact when the separable region 409 and attached redeemable member 410 are simultaneously removed from the protective glove 400. That is, the redeemable member 410 may be removed from the protective glove 400 without affecting the functionality of the glove 400. In some examples the separable region 409 may include an adhesive area as described above in reference to FIG. 1. In other examples, the redeemable member 410 may be formed from the base layer of the protective glove 400.

Figure 5:
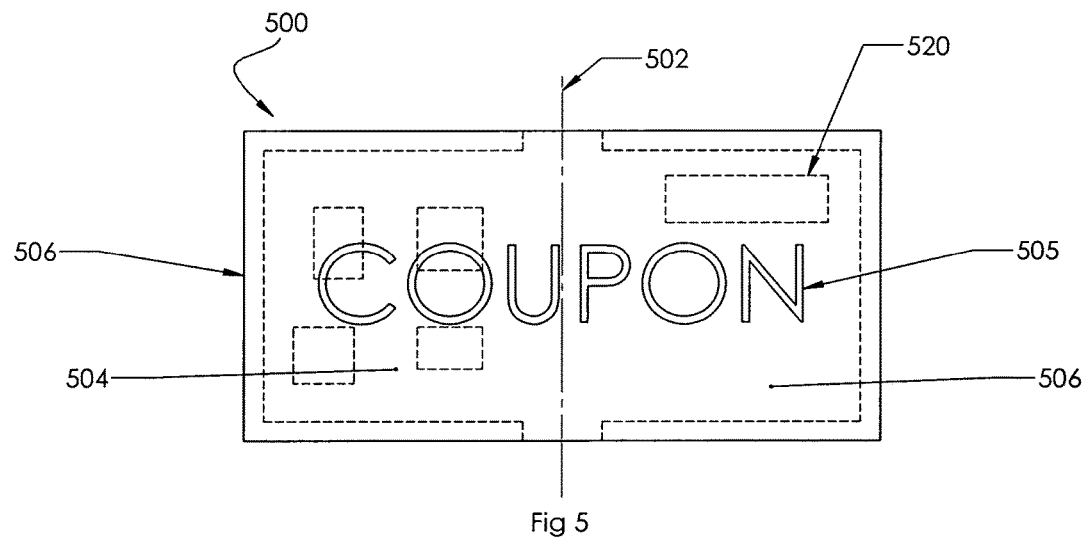
FIG. 5 illustrates another example of a redeemable member for use with a consumer usable device.
Figure 6:
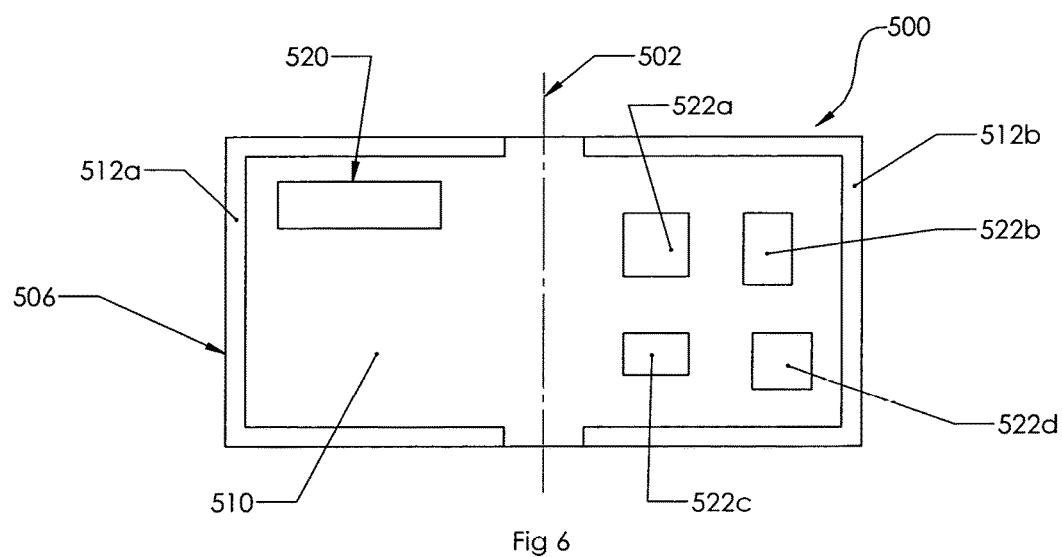
FIG. 6 illustrates a back side of the redeemable member of FIG. 5.

FIGS. 5 and 6 illustrate another example of a redeemable member 500 for use with a protective glove such as protective gloves 100, 400 discussed above with respect to FIGS. 1-4, respectively. The redeemable member 500 may be substantially similar to the redeemable members 110, 410. Alternatively the structure of redeemable member 500 may be formed directly in the base layer of the protective glove 100, 400 as depicted in FIGS. 1*f* and 2*f*, instead of being separate in FIG. 1*a* thru 1*e* and 2*a* thru 2*e*. The redeemable member 500 may include an outer surface 504 and perimeter 506. A redeemable member 500 may be folded around a fold line 502. This may enable symmetric placement of the redeemable member 500 around the seam 123, as discussed above. In some examples, the redeemable member 500 may be symmetrically formed around the fold line 502.

The outer surface 504 may include one or more indicia 505. During use when a user places their hand in a protective glove 100, 400, a user's attention may be drawn to the indicia 505. The indicia 516 may take substantially any form, including advertisement and product placement information and pictures, coupon details, deals and product sales, an interactive game, athletic team logos, and the like. In some examples, the indicia 505 may be printed, embedded, adhered to, or otherwise coupled to an outer surface 504 of the redeemable member 500. Alternatively, in an embodiment wherein the redeemable member 500 is formed into the base layer of the glove 100, 400, the indicia may be formed directly into the outer surface of the separable region 106.

The redeemable member 500 may include an inner surface 510 which may be hidden or otherwise not visible when the redeemable member 500 is coupled to a protective glove 100, 400, or it may be visible, depending on material choice for the base layer of the glove as described above. One or more adhesive regions 512*a*-*b* may be provided on an inner surface 510 of the redeemable member 500. In one example, the adhesive regions 512*a*-*b* may be provided around the entire perimeter 506 of the redeemable member 500. In other examples, the adhesive region(s) 512*a*-*b* may be provided around the perimeter 506 of the inner surface 510, but not about the fold line 502, as shown in FIG. 6. This prevents the inadvertent sticking of the coupon to itself when attaching the redeemable member 500 to the glove, as described above. The adhesive region 512*a*-*b* may include a pressure-sensitive adhesive film, a spray adhesive, double-sided tape, epoxy, glue, and the like. One or more redemption device 522*a*-*d* may be provided on an inner surface 510 of the redeemable member 500. Redemption device(s) 522*a*-*d* may be substantially similar to the redemption devices 122*a*-*d* as discussed above with respect to FIG. 2, and may enable a user to interact with a redemption system (not shown). Alternatively, in an embodiment wherein the redeemable member 500 is formed into the base layer of the glove 100, 400, the devices 522*a*-*d* may be attached to the inner surface or outer surface of the separable region 106 of the glove 100, 400

A tracking device 520 may be provided with the redeemable member 500. The tracking device 520 may be an RFID tag, NFC chip, a metallic region such as metallic trace or printed area, and the like. The tracking device 520 may interact with a redemption system (not shown) and or pre-existing merchandise detectors including metal detectors and security chip detectors (not shown). The tracking device 520 may enable a vendor to easily track the number of redeemable members 500 distributed and/or redeemed. This may provide useful business information such as the number of patrons who view and interact with the redeemable member 500, which may entice brands to advertise their products or deals on the redeemable member 500. The tracking device 520 may also enable a vendor to determine a return on investment by allowing the tracking of the number of protective gloves 100, 400 purchased from the manufacturer, distributed to patrons, and redeemed in a vendor's store. That is, the vendor may determine a connection between a patron using a protective glove 100, 400 and subsequently entering a store to redeem the redeemable member 110, 410.

In some examples the redemption device(s) 522*a-d* may take the form of a radio frequency identification (RFID) tag, a peel-and-reveal or scratch-off game, a quick response (QR) code, bar code, and the like. It is noted that the redemption device(s) 522*a-d* may take substantially any form which allows a user to redeem the redeemable member 500. In some examples, the redemption device(s) 522*a-d* may correspond to indicia 505, and may entice or incentivize a user to interact with and/or redeem the redeemable member 500 by providing a clue or an answer to a game, trivia question, and the like. In some examples the redemption device(s) 522*a-d* may be printed, embedded, adhered to, or otherwise coupled to an inner surface 510 of the redeemable member 500.

Similar to the redeemable member 410 discussed above with respect to FIG. 4, the tracking device 520 may also enable a vendor to obtain an accurate inventory count and inform a vendor when inventory is low or depleted. In other examples, the tracking device 520 may be provided at spaced intervals within a stack of gloves 100, 400, such as a stack of gloves 100, as described below in reference to FIG. 14*a-b*, in a storage container 354*a-b* as illustrated in FIG. 3.

Figure 7:
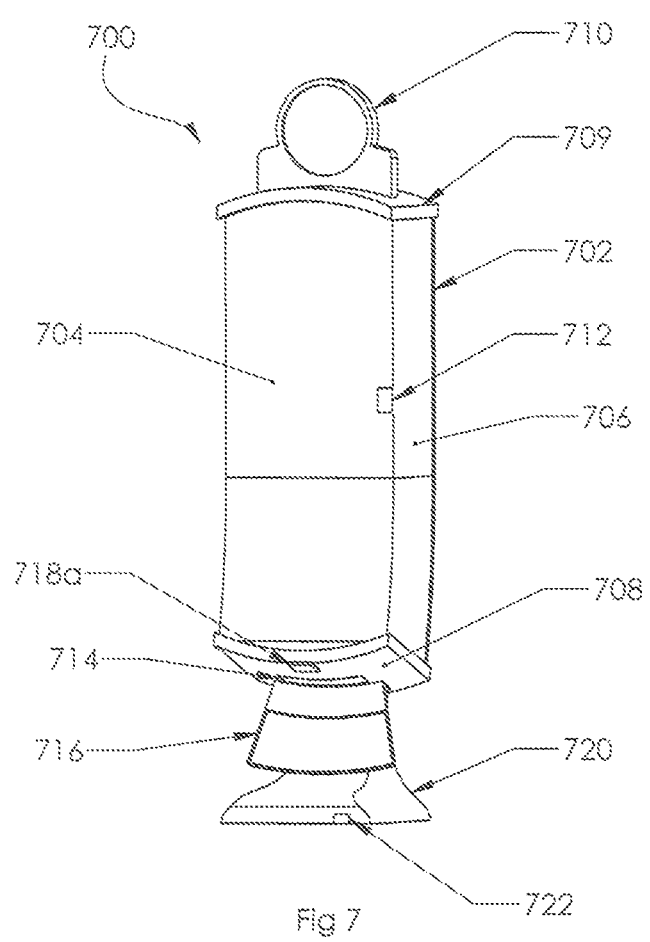
FIG. 7 is a perspective view of a distribution system for a consumer usable devices.
Figure 8:
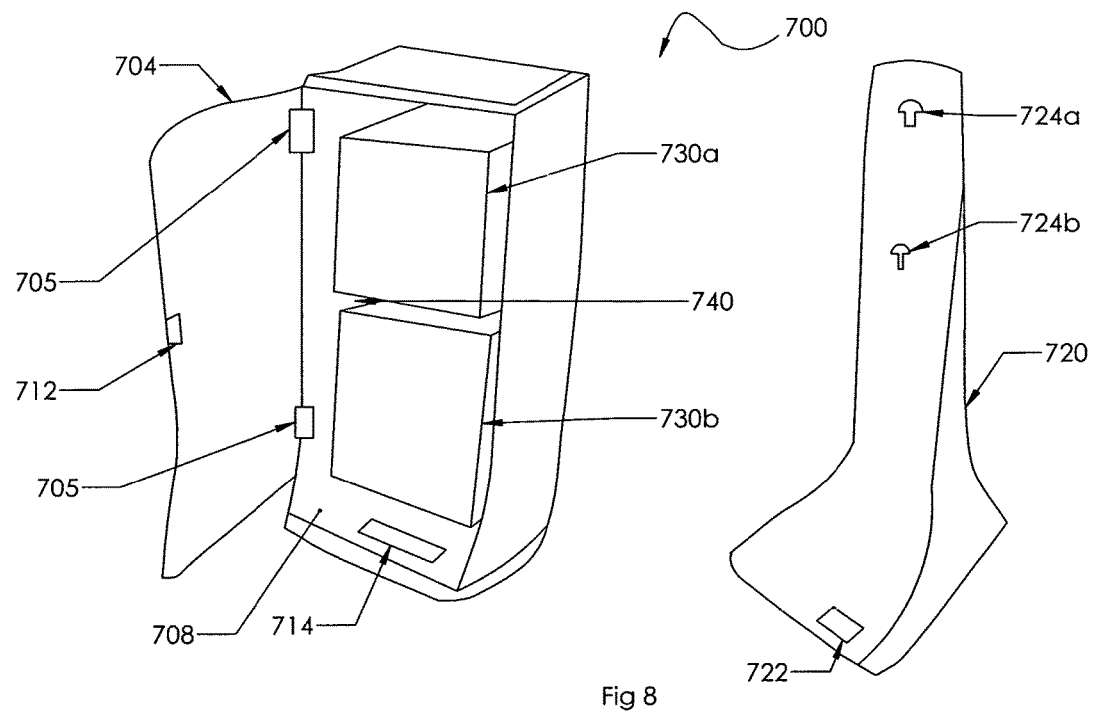
FIG. 8 is another view distribution system of FIG. 7 showing an internal volume of a dispenser body.
Figure 9:
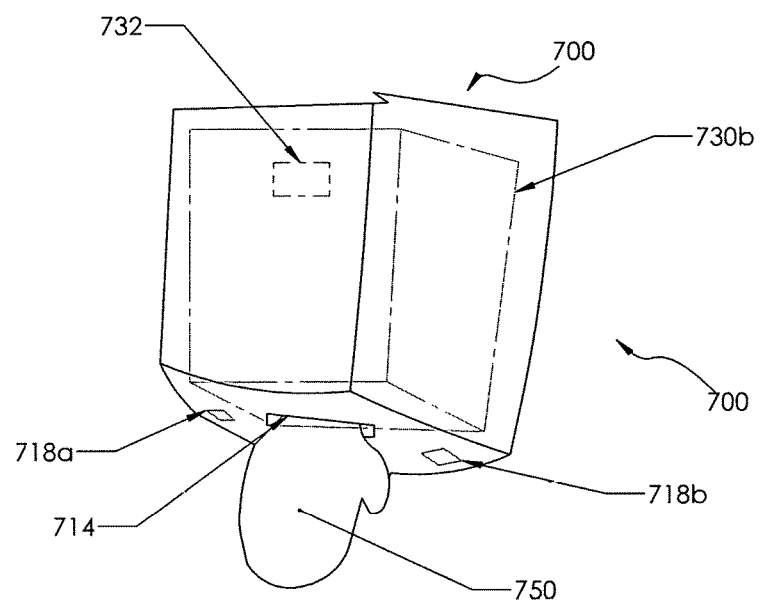
FIG. 9 is a partial detail view of the distribution system of FIGS. 7 and 8.

FIGS. 7-9 depict an example of a distribution system 700 for distributing one or more protective gloves 750, as shown in FIG. 9. Protective glove 750 may be substantially the same as protective gloves 100, 400 discussed above with respect to FIGS. 1-4. The protective gloves 750 may include a redeemable member (not shown) which is substantially similar to the redeemable member 110, 410, 500 discussed above with respect to FIGS. 1-6, respectively.

The distribution system 700 may include a dispenser including a dispenser body 702, front cover 704, top surface 709, and stand 720. An access aperture 714 may be provided on a lower surface 708 of the dispenser body 702. The front cover 704 may include a hinge mechanism 705 and a latch 712 for enabling a vendor or other user to easily access an interior of the dispenser body 702 to re-stock storage containers 730*a-b*. Storage containers 730*a-b* may include a plurality of protective gloves 750. In some examples, protective gloves 750 may be provided in a stack within storage containers 730*a-b*, further discussed below. An attention-grabbing device 710 may be provided to increase visibility of the distribution system 700 and encourage a patron to use protective gloves 750. The attention grabbing device may be attached to the distribution on any surface to include the body, stand, upper surface (as shown in FIG. 7), or lower surface. In some examples, the attention-grabbing device 710 may be a brightly colored placard, illuminated sign, and the like. The attention-grabbing device 710 may also inform patrons of the availability of protective gloves 100, 400, 750, available deals, discounts, coupons, and the like available with the redeemable members 110, 410, 500, as well as environmental impact statements. For example, when protective gloves 100, 400, 750 are formed from a biodegradable or recyclable material such as a cornstarch-based polymer, recyclable plastic, and the like, the attention-grabbing device 710 may encourage use of the protective gloves 100, 400, 750.

As illustrated in FIG. 9, the aperture 714 maybe sized to easily enable protective gloves 750 to be accessed and removed. Aperture 714 may also be sized and positioned to ensure distribution of a single protective glove 750 at a time, such as by physically resisting removal of a glove 750. In some examples, a protective glove 750 may have at least one dimension physically restricted as it is pulled through the aperture 714.

The dispenser body 702 and/or the bottom surface 708 may include one or auxiliary device(s) 718*a-b*. In some examples, the auxiliary device(s) 718*a-b* may comprise a transceiver to aid in determining in the number of protective gloves 750 have been used and/or how many protective gloves remain in the storage containers 730*a-b*. When a protective glove 750 is provided with a tracking device such as the tracking device 420, 520 of FIGS. 4 and 5, respectively, the auxiliary device(s) 718*a-b* may track the inventory of gloves 750 and the number of gloves 750 distributed. In one example, the auxiliary device 718*a* may enable tracking of the number of protective gloves 750 have been used, and the auxiliary device 718*b* may determine the number of gloves 750 remaining in storage containers 730. This is considered a means of data collection. In other examples, an auxiliary device 732 may be provided in the body 702 of the dispenser. Auxiliary device 732 may operate to determine the inventory count of protective gloves 750 in storage containers 730. Other embodiments of auxiliary device(s) 718*a-b* and 732 include proximity sensors that detect if a customer removed a glove, optical sensors that detect changes in light levels as to illuminate a light contained in attention-grabbing device 710, or antennas for the relay of information.

It is noted that in some examples, the auxiliary device(s) 718*a*-band 732 may interact with and allow a user to redeem a redemption device 122, 522. In one example, auxiliary device 718*a* may be an RFID transponder, a barcode or QR-code reader, and the like.

Devices 718, 732 may be in contact via wired or wireless transmission to a distribution tracking system (not shown). The distribution tracking system may enable a vendor to tack and determine usage of gloves 750, determine if inventory is depleted, as well as determine useful business information such as the number of gloves 750 distributed, redeemed, visibility of redeemable devices, and the like, as discussed above with respect to FIGS. 5-6. In some examples, the distribution tracking system may be accessible by a vendor as well as other parties, such as product manufacturers, advertisers, and the like, via a web interface, computer terminal, periodic reports, and the like.

As illustrated in FIGS. 7-8, the distribution system 700 may also include a stand 720 for enabling easy and versatile placement of the distribution system 700 such as on a counter, an exterior surface, and the like. The stand 720 may include one or more keyhole hangers 724*a-b* for securely and removably attaching the dispenser body 702 to the stand 720. One or more pegs (not shown) may be provided on a dispenser body 702 which correspond to keyhole hangers 724*a-b* to easily attach the body 702 to the stand 720. However, it is noted that other attachment mechanisms may be provided to enable the body 702 to be secured to the stand 720, such as adhesives, screws, bolts, hook and loop attachments, and the like.

The stand 720 may be provided with a redemption device reader 722. In one example, the redemption device reader 722 may interact with and allow a user to redeem a redemption device 122, 522. In other examples, a redemption device 722 may be an RFID transponder, a barcode or QR-code reader, and the like. Similar to devices 718*a-b*, the redemption device reader 722 may be in contact via wired or wireless transmission to a distribution tracking system (not shown). The distribution tracking system may enable a vendor to tack and determine usage of gloves 750, determine if inventory is depleted, as well as determine useful business information such as the number of gloves 750 distributed, redeemed, visibility of redeemable devices, and the like, as discussed above with respect to FIGS. 5-6. In some examples, the distribution tracking system may be accessible by a vendor as well as other parties, such as product manufacturers, advertisers, and the like, via a web interface, a computer terminal, periodic reports, and the like.

Figure 10:
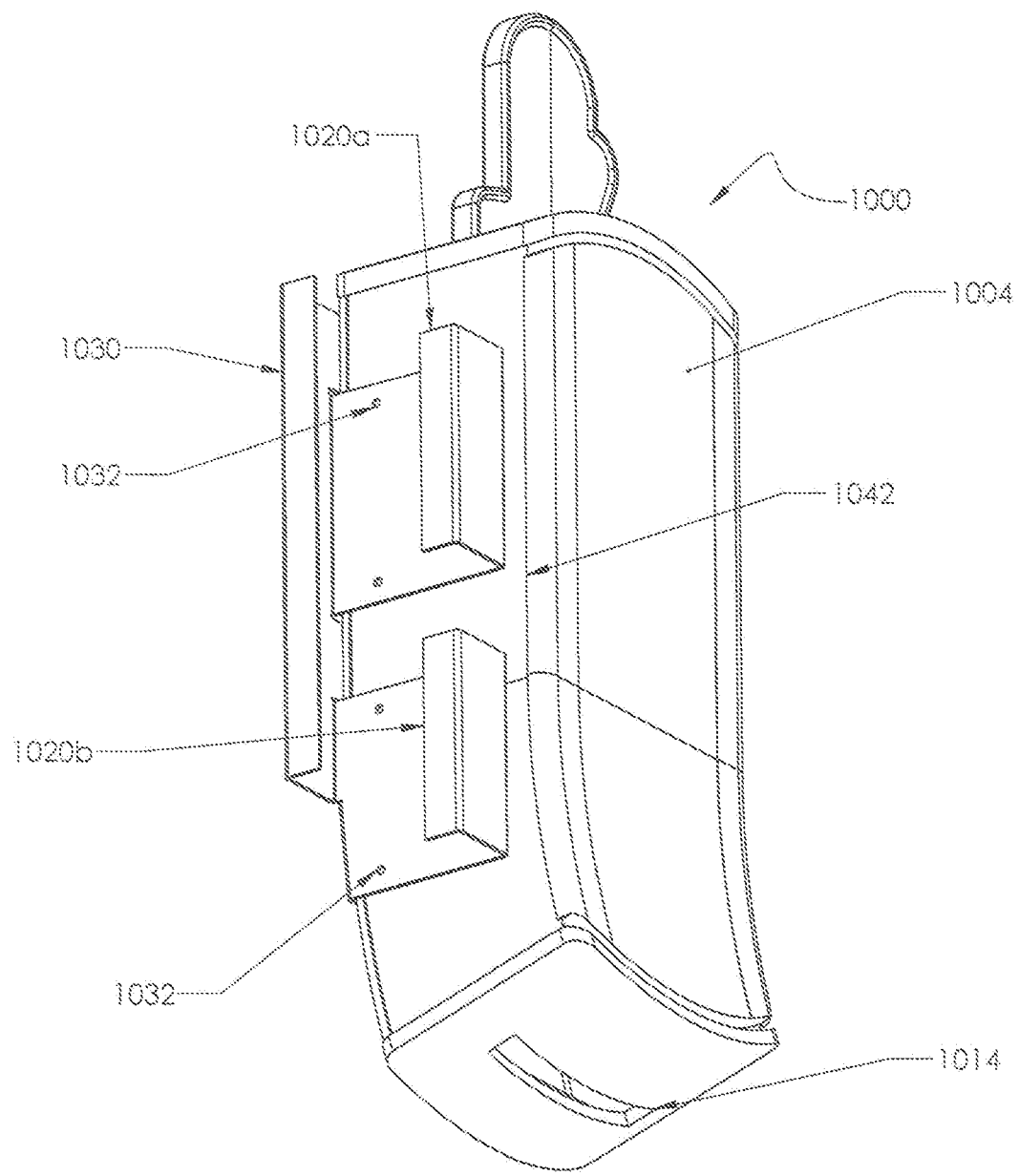
FIG. 10 illustrates another example of the distribution system of FIG. 7.

FIG. 10 shows an alternate example of a distribution system 1000. Similar to distribution system 700, the distribution system 1000 may provide a reliable method of distributing one or more protective gloves, such as protective gloves 100, 400, 750. The distribution system 1000 may include a body 1002, a front cover 1004, and a hinge 1042 rotatably coupling the front cover 1004 to the body 1002. An attention-grabbing device (not shown) may be provided to increase visibility of the distribution system 1000 and encourage a patron to use protective gloves (not shown), and provide the structure and functionally of attention-grabbing device 710 as described above.

In some examples, a mounting mechanism 1020, 1030 may be provided to enable attachment of the distribution system 1000 to existing structures such as, for example, the pump 300 discussed above with respect to FIG. 3. The mounting mechanism may include a one or more brackets 1020*a-b*, and 1030 coupled to the body 1002 by mounting devices 1032 such as screws, bolts, rivets, an adhesive layer, hook and loop material, and the like.

FIGS. 11*a-f* illustrate additional examples of consumer devices including redeemable members. The redeemable members 1106, 1108, 1126, 1136, 1146, 1156 of FIGS. 11A-11*f*, respectively, may be substantially similar to the redeemable members 110, 410, 500 discussed above with respect to FIGS. 1-5, respectively.

Figure 11:
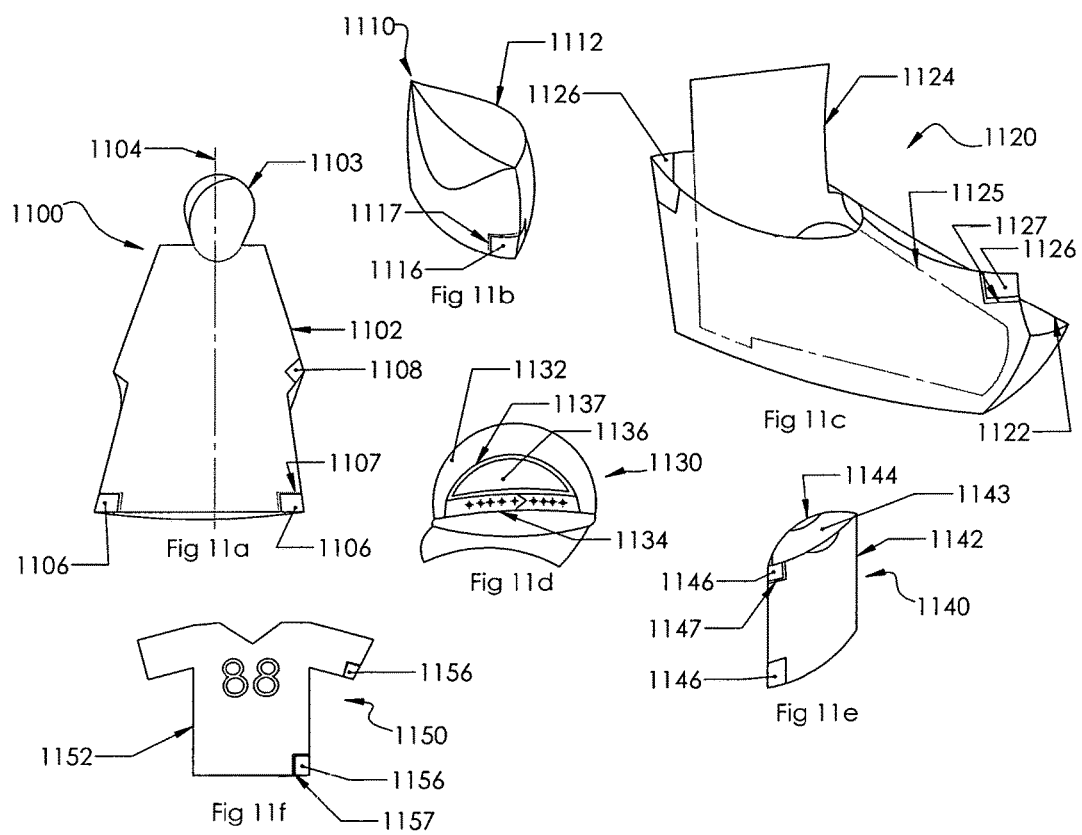
FIG. 11A-11F illustrates alternate examples of a consumer usable device including a redeemable member.

FIG. 11*a* illustrates a protective garment 1100 which can be worn over the body and/or head of user (not shown). The protective garment 1100 may be formed from a water-resistant material such as plastic, textiles, woven and non-woven fabrics and the like. In one example, the protective garment 1100 may be a rain jacket, poncho, and the like. The body 1102 may be sized and shaped to protect a user's torso (not shown). A hood 1103 may be provided to protect a user's head. The body 1102 and hood 1103 may be substantially symmetric about a fold axis 1104.

One or more redeemable members 1106, 1108 may be provided on the body 1102 or hood 1103 of the protective garment 1100 in a separable region 1107 similar to the separable region 109, 409 discussed above with respect to FIGS. 1 and 4 to enable the redeemable members 1106, 1108 to easily be removed without causing damage to the rest of the protective garment 1100. In some examples, the separable region 1107 may include a weakened area, perforations, and adhesive layer, and the like, to enable easy removal of the redeemable member(s) 1106, 1108 while leaving the body 1102 intact. In other examples, one or more redeemable members 1106, 1108 may be integral with the body 1102 of the protective garment 1100.

FIG. 11B illustrates another example of a consumer device such as a protective hat 1110. The protective hat 1110 may be sized and shape to be worn over a user's head (not shown). The protective hat 1110 may be formed from a water-resistant material such as plastic, textiles, woven and non-woven fabrics and the like.

One or more redeemable members 1116 may be provided on the body 1112 of the protective hat 1110 in a separable region 1117 similar to the separable region 109, 409 discussed above with respect to FIGS. 1 and 4 to enable the redeemable members to easily be removed without causing damage to the rest of the protective hat 1110. In some examples, the separable region 1117 may include a weakened area, perforations, and adhesive layer, and the like, to enable easy removal of the redeemable member(s) 1116 while leaving the body 1112 intact. In other examples, one or more redeemable members 1116 may be integral with the body 1112 of the protective garment 1100.

FIG. 11C illustrates an example of a consumer device such as a protective foot cover 1120. The protective foot cover 1120 may be sized and shape to be worn over a user's 1124 shoe 1125. The protective foot cover 1120 may be formed from a water-resistant material such as plastic, textiles, woven and non-woven fabrics, and the like.

One or more redeemable members 1126 may be provided on the body 1122 of the protective foot cover 1120 in a separable region 1127 similar to the separable region 109, 409 discussed above with respect to FIGS. 1 and 4 to enable the redeemable members. In one example, a separable member 1127 maybe provided to enable the redeemable member(s) 1126 to be easily removed without causing damage to the rest of the protective foot cover 1120. In some examples, the separable region 1127 may include a weakened area, perforations, and adhesive layer, and the like, to enable easy removal of the redeemable member(s) 1126 while leaving the body 1122 intact. In other examples, one or more redeemable members 1126 may be integral with the body 1122 of the protective foot cover 1120.

FIG. 11D illustrates an example of a consumer device such as a baseball cap 1130. The baseball cap 1130 may substantially any material such as plastic, textiles, woven and non-woven fabrics, and the like. The baseball cap 1130 may include an adjustment device 1134 to allow a user (not shown) to fit the baseball cap 1130 to their head.

The baseball cap 1130 may include one or more redeemable members 1136. The redeemable member 1136 may be provided on the body 1132 of the baseball cap 1130 in a separable region 1107 similar to the separable region 109, 409 discussed above with respect to FIGS. 1 and 4 to enable the redeemable members. In one example, a separable region 1137 maybe provided to enable the redeemable member(s) 1136 to be easily removed without causing damage to the baseball cap 1130. In some examples, the separable region 1137 may include a weakened area, perforations, and adhesive layer, and the like, to enable easy removal of the redeemable member(s) 1136 while leaving the body 1132 intact. In other examples, one or more redeemable members 1136 may be integral with the body 1132 of the baseball cap 1130.

FIG. 11E illustrates an example of a consumer device such as a bag 1140. In some examples the bag 1140 may be a litter bag, shopping bag, protective bag, and the like. The bag 1140 may include an opening 1143 for accessing an interior volume 740 and at least one handle 1144 such as an aperture sized to allow a user's hand to grasp and hold the handle 1144. The bag 1140 may be formed from a durable material such as plastic, textiles, woven and non-woven fabrics, and the like.

One or more redeemable members 1146 may be provided on the body 1142 of the bag 1140 in a separable region 1147 similar to the separable region 109, 409 discussed above with respect to FIGS. 1 and 4 to enable the redeemable members. In one example, a separable region 1147 maybe provided to enable the redeemable member(s) 1146 to be easily removed without causing damage to the body 1142 of the bag 1140. In some examples, the separable region 1147 may include a weakened area, perforations, and adhesive layer, and the like, to enable easy removal of the redeemable member(s) 1146 while leaving the body 1140 intact. In other examples, one or more redeemable members 1146 may be integral with the body 1142 of the bag 1140.

FIG. 11*f* illustrates an example of a consumer device such as a jersey 1150. The jersey 1150 may substantially any material such as plastic, textiles, woven and non-woven fabrics, and the like.

The jersey 1150 may include one or more redeemable members 1156. The redeemable member 1156 may be provided separable region 1157 of the jersey 1150 which is similar to the separable region 109, 409 discussed above with respect to FIGS. 1 and 4 to enable the redeemable members to be easily removed without damaging the body 1153. In some examples, the separable region 1157 may include a weakened area, perforations, and adhesive layer, and the like, to enable easy removal of the redeemable member(s) 1156 while leaving the body 1152 intact. In other examples, one or more redeemable members 1156 may be integral with the body 1152 of the jersey 1150.

Figure 12:
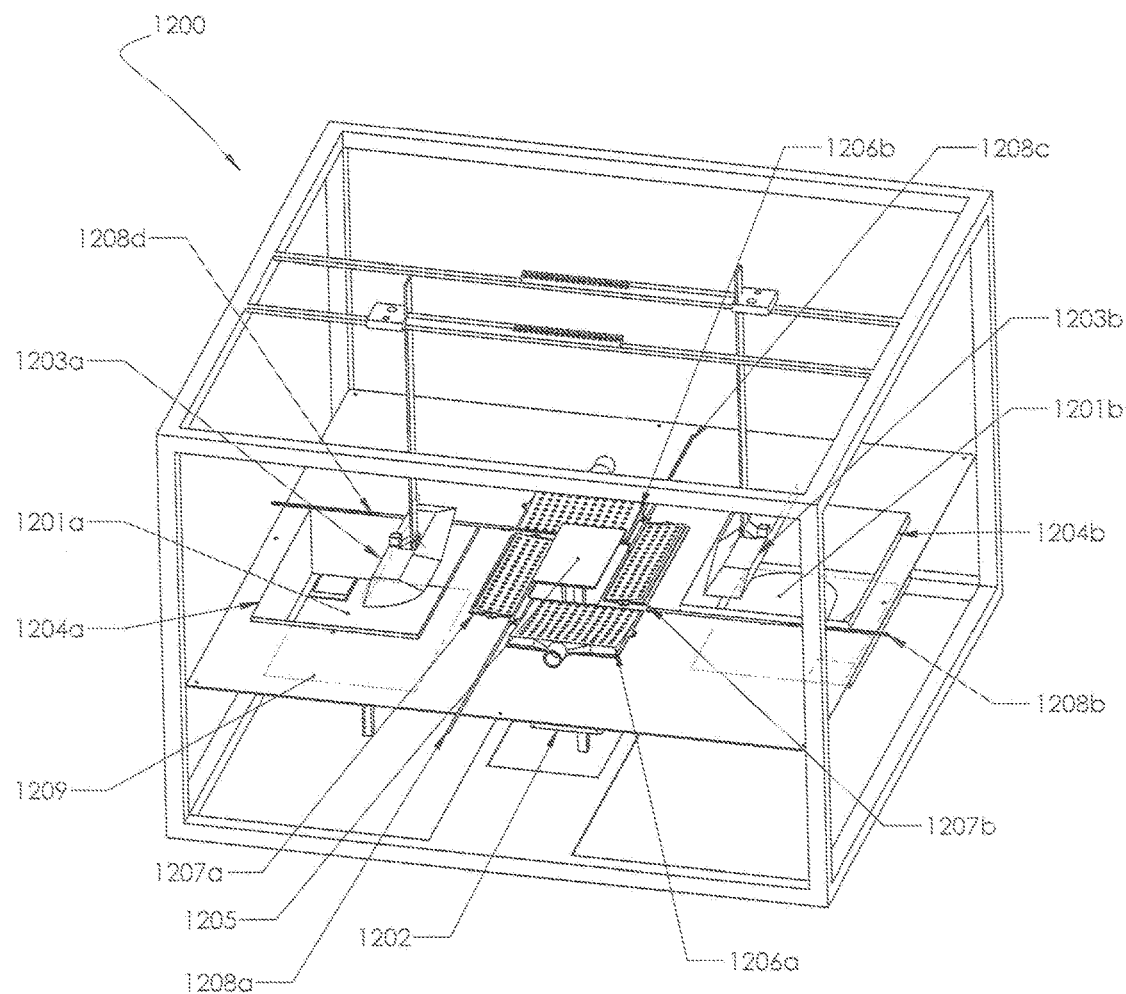
FIG. 12 is a perspective view of a folding machine which creates a stack of a plurality of consumer usable devices such as protective gloves.

FIG. 12 illustrates an example of a folding machine 1200 that takes unfolded piles of consumer usable devices 1201*a-b* such as the glove 100, 400, 750, and processes them to create a folded stack of gloves 1404. The folding machine may also place the stack of gloves 1404 into a storage container (not shown) similar to the storage container 730*a-b* to be dispensed by a distribution system such as the distribution system 700 described above in reference to FIGS. 8 and 9.

FIG. 12 illustrates a folding machine 1200 may utilize one or more pick and place mechanisms 1203*a-b* to remove a single consumer usable device 1300, 1401, 1402, 1403 from the unfolded piles of consumer usable devices 1201*a-b* located in bins 1204*a-b*. The folding machine may then move the single consumer usable device to a central folding platform 1205 where the single consumer usable device 1300, 1401, 1402, 1403 may undergo a folding processes described below.

The folding process involves finger blowers 1206*a-b*, thumb blowers 1207, and may include fold line pistons 1208*a-d*. The finger blowers 1206*a-b* and thumb blowers 1207*a-b* provide a burst of air (not shown) to fold a plurality of single consumer usable devices 1300, 1401, 1402, 1403 about fold lines 1301*a-b* in the folding process. The fold line may be produced using fold pistons that travel in the axis of the fold lines to assist in creating repeatable folds about the fold lines 1301*a-b*, to create an interlocking stack of gloves 1404.

During the folding process, the central folding platform may lower in increments (not shown) to ensure the interlocking stack of gloves remain at the height of the folding table 1209 to allow the finger blowers 1206*a-b* and thumb blowers 1207*a-b* are able to provide a fold about fold lines 1301*a-b*. After the folding process is complete and the interlocking stack of gloves 1404, which may fold any number of single consumer usable devices into an intertwined stack of gloves, the central folding platform may drop down into the storage container 1202 which may then be removed from the folding machine.

Figure 13:
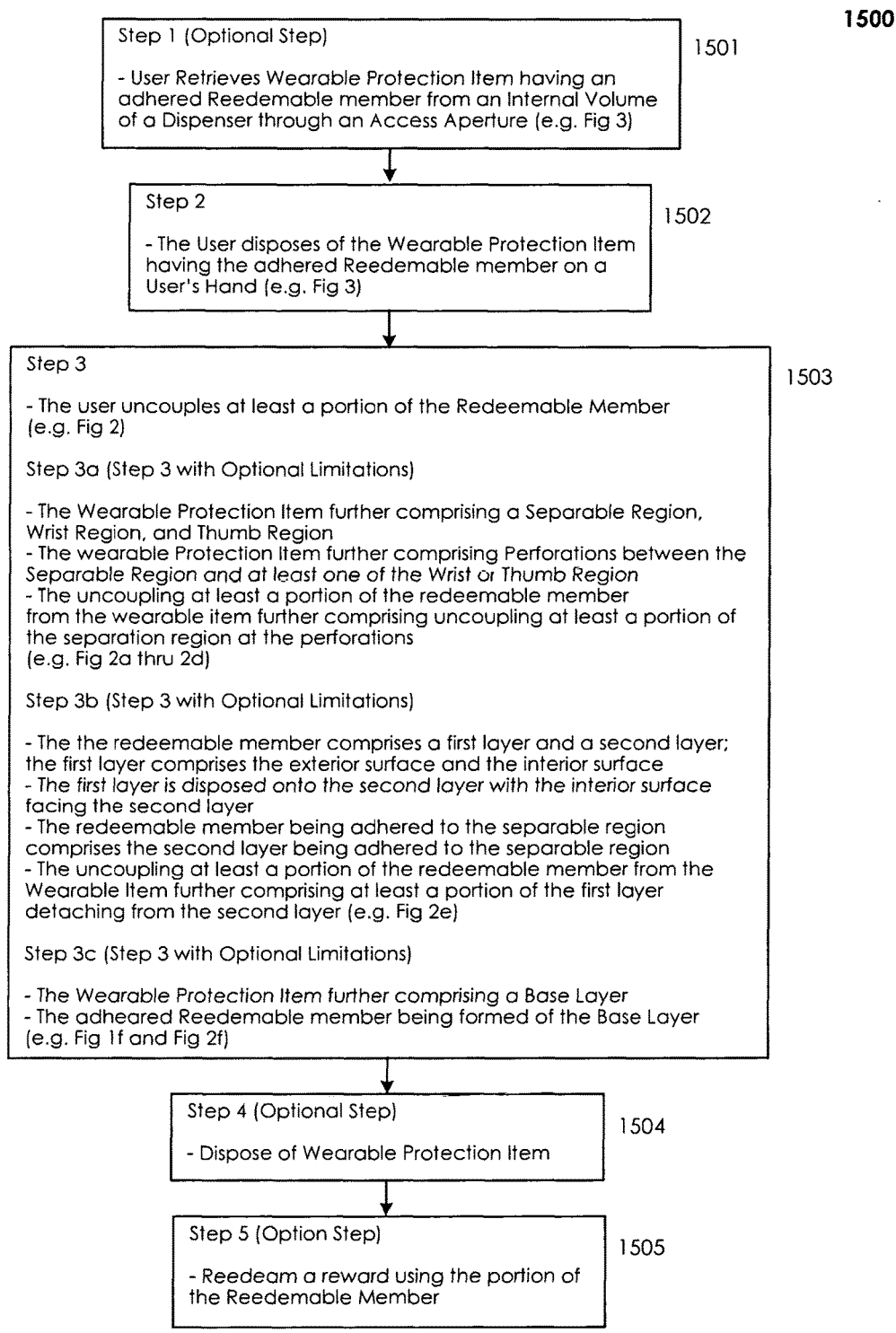
FIG. 13 illustrates a process of using a consumer usable device.

FIG. 13 illustrates a process 1500 of using a redeemable member 110, similar to the embodiments shown in FIGS. 1 and 1*a* thru 1*f*. In the process of using, the glove may first be removed 1501 from a dispenser system, such as 300 and 700 as described above and depicted in FIGS. 3 and 7 thru 10. This step is optional. The second step is the user disposing the glove on their hand 1502.

This third step is removing at least a portion 1503 of the redeemable member 110, described above. This may also comprise additional structure and steps depending upon the embodiment of the redeemable member 110. These optional steps are described in step 3 1503.

The fourth step, which is optional is disposing, or throwing away the body 114, described above and depicted in FIG. 1, while retaining the at least a portion of the redeemable member.

The fifth step, which is optional, comprises redeeming a reward (not shown) from an establishment with the redeemable member 110 using the indicia 116 or 120 to prove the validity of the redeemable member 110.

The invention has now been described in detail for the purposes of clarity and understanding. However, it will be appreciated that certain changes and modifications may be practiced within the scope of the appended claims.

What is claimed is:

1. A wearable protection item having a redeemable member, wherein the wearable protection item comprises:
    a protective glove comprising a finger region, a thumb region, a palm region, a wrist region, and a separable region wherein:
        the wrist region and the separable region define an opening into the protective glove, the opening comprising an edge; and
        the separable region is adjacent to the wrist region and the thumb region;
    the redeemable member comprising an exterior surface and an interior surface, wherein at least one of the exterior surface or the interior surface has an indicia thereon, wherein the redeemable member is adhered to the separable region, and wherein the protective glove defines perforations between the separable region and at least one of the thumb region or the wrist region.

2. The wearable protection item having the redeemable member of claim 1, wherein:
    the separable region defines a smaller portion of the edge than the wrist region.

3. The wearable protection item having the redeemable member of claim 1, wherein:
    the thumb region and the separable region comprise a seam extending from the thumb region to the opening; and
    the redeemable member is adhered to the separable region over at least a portion of the seam.

4. The wearable protection item having the redeemable member of claim 1, wherein the redeemable member comprises:
    a first indicia on the exterior surface and a second indicia on the interior surface.

5. The wearable protection item having the redeemable member of claim 4, wherein:
    the first indicia comprises an advertisement; and
    the second indicia comprises a redeemable code.

6. The wearable protection item having the redeemable member of claim 1, wherein the redeemable member being adhered to the separable area comprises:
    an adhesive disposed between the redeemable member and the separable area.

7. The wearable protection item having the redeemable member of claim 1, wherein:
    the redeemable member comprises a first layer and a second layer;

the first layer comprises the exterior surface and the interior surface;

the first layer is disposed onto the second layer with the interior surface facing the second layer; and the redeemable member being adhered to the separable region comprises the second layer being adhered to the separable region.

8. The wearable protection item having the redeemable member of claim 1, wherein:

the separable region comprising a first aperture and second aperture, the apertures comprising a first full perimeter and second full perimeter respectively; and the redeemable member being adhered to the separable region comprises the redeemable member being adhered to at least a portion of the separable region between the apertures and the perforations.

9. The wearable protection item having the redeemable member of claim 1, wherein:

the redeemable member defines perforations.

10. The wearable protection item having the redeemable member of claim 1, wherein the wearable protection item further comprises:

a means for data collection.

11. A wearable protection item having a redeemable member, wherein the wearable protection item comprises:

a protective glove formed from a base layer and comprising a finger region, a thumb region, a palm region, a wrist region, and a separable region wherein:

the wrist region and the separable region define an opening into the protective glove, the opening comprising an edge;

the separable region is adjacent to the wrist region and the thumb region; and the protective glove defines perforations between the separable region and at least one of the thumb region or the wrist region;

the redeemable member comprising an exterior surface and an interior surface, wherein at least one of the exterior surface or the interior surface has an indicia thereon; and wherein the redeemable member formed of the base layer within at least a portion of the separable region.

12. The wearable protection item having the redeemable member of claim 11, wherein:

the thumb region and the separable region comprise a seam extending from the thumb region to the opening; and the redeemable member is formed in the separable region over at least a portion of the seam.

* * * * *